United States Patent
Diep et al.

(10) Patent No.: US 6,671,811 B1
(45) Date of Patent: Dec. 30, 2003

(54) FEATURES GENERATION FOR USE IN COMPUTER NETWORK INTRUSION DETECTION

(75) Inventors: Thanh A. Diep, Los Altos, CA (US); Sherif M. Botros, Foster City, CA (US); Martin D. Izenson, Foster City, CA (US)

(73) Assignee: Visa Internation Service Association, Foster City, CA (US)

( * ) Notice: Subject to any disclaimer, the term of this patent is extended or adjusted under 35 U.S.C. 154(b) by 0 days.

(21) Appl. No.: 09/427,176

(22) Filed: Oct. 25, 1999

(51) Int. Cl.$^7$ .......................... G06F 9/00; G06F 15/173; H02H 3/05
(52) U.S. Cl. .......................... 713/201; 714/33; 714/38; 709/223
(58) Field of Search .................. 713/201, 200, 713/202; 714/26, 33, 37, 38, 39

(56) References Cited

U.S. PATENT DOCUMENTS

| | | | |
|---|---|---|---|
| 5,375,244 A | 12/1994 | McNair | 395/725 |
| 5,557,686 A | 9/1996 | Brown et al. | 382/115 |
| 5,621,889 A | 4/1997 | Lermuzeaux et al. | 395/186 |
| 5,825,750 A | 10/1998 | Thompson | 370/244 |
| 6,336,138 B1 * | 1/2002 | Caswell et al. | 709/223 |

OTHER PUBLICATIONS

Lunt T. F. et al., "Knowledge–based Intrusion Detection", Proceedings of the Annual Artificial Intelligence Systems in Government Conference, US, Washington, IEEE Comp. Soc. Press, vol. Conf. 4, pp. 102–107.

* cited by examiner

Primary Examiner—Norman M. Wright
(74) Attorney, Agent, or Firm—Beyer Weaver & Thomas LLP (57) ABSTRACT

Detecting harmful or illegal intrusions into a computer network or into restricted portions of a computer network uses a features generator or builder to generate a feature reflecting changes in user and user group behavior over time. User and user group historical means and standard deviations are used to generate a feature that is not dependent on rigid or static rule sets. These statistical and historical values are calculated by accessing user activity data listing activities performed by users on the computer system. Historical information is then calculated based on the activities performed by users on the computer system. The feature is calculated using the historical information based on the user or group of users activities. The feature is then utilized by a model to obtain a value or score which indicates the likelihood of an intrusion into the computer network. The historical values are adjusted according to shifts in normal behavior of users of the computer system. This allows for calculation of the feature to reflect changing characteristics of the users on the computer system.

31 Claims, 9 Drawing Sheets

FEATURES GENERATION FOR USE IN COMPUTER NETWORK INTRUSION DETECTION

BACKGROUND OF THE INVENTION

1. Field of the Invention

The present invention relates generally to the field of computer systems software and computer network security. More specifically, it relates to software for examining user and group activity in a computer network for detecting intrusions and security violations in the network.

2. Discussion of Related Art

Computer network security is an important issue for all types of organizations and enterprises. Computer break-ins and their misuse have become common features. The number, as well as sophistication, of attacks on computer systems is on the rise. Often, network intruders have easily overcome the password authentication mechanism designed to protect the system. With an increased understanding of how systems work, intruders have become skilled at determining their weaknesses and exploiting them to obtain unauthorized privileges. Intruders also use patterns of intrusion that are often difficult to trace and identify. They use several levels of indirection before breaking into target systems and rarely indulge in sudden bursts of suspicious or anomalous activity. If an account on a target system is compromised, intruders can carefully cover their tracks as not to arouse suspicion. Furthermore, threats like viruses and worms do not need human supervision and are capable of replicating and traveling to connected computer systems. Unleashed at one computer, by the time they are discovered, it is almost impossible to trace their origin or the extent of infection.

As the number of users within a particular entity grows, the risks from unauthorized intrusions into computer systems or into certain sensitive components of a large computer system increase. In order to maintain a reliable and secure computer network, regardless of network size, exposure to potential network intrusions must be reduced as much as possible. Network intrusions can originate from legitimate users within an entity attempting to access secure portions of the network or can originate from illegitimate users outside an entity attempting to break into the entity's network often referred to as "hackers." Intrusions from either of these two groups of users can be damaging to an organization's computer network. Most attempted security violations are internal; that is, they are attempted by employees of an enterprise or organization.

One approach to detecting computer network intrusions is calculating "features" based on various factors, such as command sequences, user activity, machine usage loads, resource violations, files accessed, data transferred, terminal activity, network activity, among others. Features are then used as input to a model or expert system which determines whether a possible intrusion or violation has occurred. The use of features is well-known in various fields in computer science including the field of computer network security, especially in conjunction with an expert system which evaluates the feature values. Features used in present computer security systems are generally rule-based features. Such features lead to computer security systems that are inflexible, highly complex, and require frequent upgrading and maintenance.

Expert systems that use such features generally use thresholds (e.g., "if-then-else" clauses, "case" statements, etc.) to determine whether there was a violation. Thus, a human expert with extensive knowledge of the computer network domain has to accurately determine and assign such thresholds for the system to be effective. These thresholds and other rules are typically not modified often and do not reflect day-to-day fluctuations based on changing user behavior. Such rules are typically entered by an individual with extensive domain knowledge of the particular system. In short, such systems lack the robustness needed to detect increasingly sophisticated lines of attack in a computer system. A reliable computer system must be able to accurately determine when a possible intrusion is occurring and who the intruder is, and do so by taking into account trends in user activity.

As mentioned above, rule-based features can also be used as input to a model instead of an expert system. However, a model that can accept only rule-based features and cannot be trained to adjust to trends and changing needs in a computer network generally suffers from the same drawbacks as the expert system configuration. A model is generally used in conjunction with a features generator and accepts as input a features list. However, models presently used in computer network intrusion detection systems are not trained to take into account changing requirements and user trends in a computer network. Thus, such models also lead to computer security systems that are inflexible, complex, and require frequent upgrading and maintenance.

Figure 1:
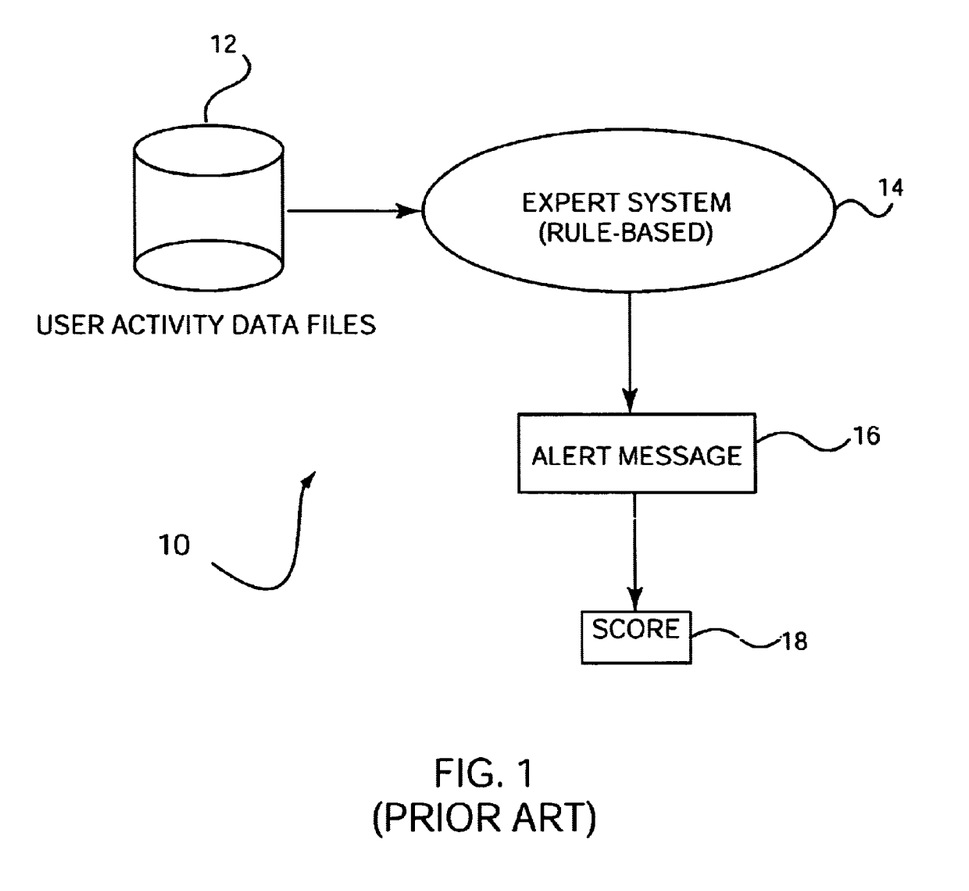
FIG. 1 is a block diagram of a features/expert system component of a security system in a computer network as is presently known in the art.

FIG. 1 is a block diagram depicting certain components in a security system in a computer network as is presently known in the art. A features/expert systems component 10 of a complete network security system (not shown) hits three general components: user activity 12, expert system 14, and alert messages 16. User activity 12 contains "raw" data, typically in the form of aggregated log files and is raw in that it is typically unmodified or has not gone through significant preprocessing. User activity 12 has records of actions taken by users on the network that the organization or enterprise wants to monitor.

Expert system 14, also referred to as a "rule-based" engine, accepts input data from user activity files 12 which acts as features in present security systems. As mentioned above, the expert system, a term well-understood in the field of computer science, processes the input features and determines, based on its rules, whether a violation has occurred or whether there is anomalous activity. In two simple examples, expert system 14 can contain a rule instructing it to issue an alert message if a user attempts to logon using an incorrect password more than five consecutive times or if a user attempts to write to a restricted file more than once.

Alert message 16 is issued if a rule threshold is exceeded to inform a network security analyst that a possible intrusion may be occurring. Typically, alert message 16 contains a score and a reason for the alert, i.e., which rules or thresholds were violated by a user. As stated above, these thresholds can be outdated or moot if circumstances change in the system. For example, circumstances can change and the restricted file mentioned above can be made accessible to a larger group of users. In this case an expert would have to modify the rules in expert system 14.

As mentioned above, the feature and expert system components as shown in FIG. 1 and conventional models used in conjunction with these components have significant drawbacks. One is the cumbersome and overly complex set of rules and thresholds that must be entered to "cover" all the possible security violations. Another is the knowledge an expert must have in order to update or modify the rule base and the model to reflect changing circumstances in the organization. Related to this is the difficulty in locating an expert to assist in programming and maintaining all components in the system.

Therefore, it would be desirable to utilize a features generator in place of a traditional expert system that can automatically update itself to reflect changes in user and user group current behavior. It would also be desirable to have such a features generator be self-sufficient and flexible in that it is not dependent on changes by an expert and is not a rigid rule-based system. That is, the features generator should not be dependent on or assume to have extensive system domain knowledge. It would also be desirable to have the features generator use historical and other system data to modify itself so that it can take into account current user activity behavior and trends.

SUMMARY OF THE INVENTION

To achieve the foregoing, methods, apparatus, and computer-readable medium are disclosed which provide computer network intrusion detection. In one aspect of the present invention, a method of detecting an intrusion into a computer system is described. User activity data listing activities performed by users on the computer system is gathered by the intrusion detection program. Historical information is then calculated based on the activities performed by users on the computer system. Also calculated is a feature using the historical information based on the user activities. The feature is then utilized by a model to obtain a value or score which indicates the likelihood of an intrusion into the computer network. The historical values are adjusted according to shifts in normal behavior of users of the computer system. This allows for calculation of the feature to reflect changing characteristics of the users on the computer system.

In one embodiment of the present invention user log files are accessed when gathering the user activity data. In another embodiment the user activity data corresponds to a previously determined time period. In yet another embodiment a user historical mean and a user historical standard deviation is calculated for a particular user based on the user's activity data. In yet another embodiment a peer or user group historical mean and a peer historical standard deviation is calculated based on activities performed by the entire user group. In yet another embodiment a feature is calculated by retrieving the user historical mean and the user historical standard deviation. This information is then used to compute a deviation of behavior of the user from the user historical mean. In yet another embodiment further steps taken to calculate a feature include retrieving the peer historical mean and the peer historical standard deviation and computing another deviation of behavior of the user from the peer historical mean.

In another aspect of the present invention a method of generating a feature to be used in a model is disclosed. User-specific activity data is collected for a pre-selected number of activities. Based on the user-specific activity data, user-specific historical data for a particular activity is generated. Peer historical data values are then generated for the particular activity. The user-specific historical data and the peer historical data are then utilized to generate a feature associated with the particular activity. The feature reflects current and past behavior of a particular user and of a group of users on a computer system with respect to the particular activity.

In one embodiment a user deviation from normal behavior of the particular behavior is calculated. In another embodiment a deviation from peer normal activity by the particular user for the activity is calculated. In yet another embodiment generating user-specific historical data for a particular activity involves determining the number of times the particular activity was performed by a user during a specific time period. A previous user historical mean value is calculated and is associated with the particular activity using the number of times the activity was performed. A current user historical mean value is calculated and a previous user historical standard deviation value calculated and is associated with particular activity using the number of times the activity was performed. This leads to a current user historical standard deviation value.

In another aspect of the present invention a computer network intrusion detection system is described. The intrusion detection system includes a user activity data file that contains user-specific data related to activities performed by a particular user. A historical data file contains statistical and historical data related to past behavior of the user and of the user's peer group. A features generator or builder accepts as input the user-specific data and the statistical data related to past behavior of a user and of a peer group. This allows the features generator to calculate a feature based on current and past behavior of the user and the current and past behavior of the peer group.

In one embodiment the network intrusion detection system contains a model trained to accept as input a feature generated by the features generator and to output a score indicating the likelihood that a particular activity is an intrusion. In another embodiment the user activity data file includes a user identifier, an activity description, and a timestamp. In yet another embodiment, the network intrusion detection system includes a features list logically segmented where each segment corresponds to a user and contains values corresponding to activities performed by the user. A segment in the features list has a section contains user-related values indicating the degree of normality or abnormality of the user's behavior compared to prior behavior. Another section in a segment contains peer-related values indicating the degree of normality or abnormality of the user's behavior compared to behavior of the user's peers. In yet another embodiment the historical data file contains a user and peer historical means and user and peer historical standard deviations.

BRIEF DESCRIPTION OF THE DRAWINGS

The invention may be best understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for using historical and statistical data in conjunction with current user activity data to derive features for use in a computer network intrusion detection program is described in the various figures. The techniques used in the present invention take user and peer activity data and calculate means and standard deviations based on the activity data which are then used to generate a features list. By using the historical data, the features generator can take into account changing behavior of the user and of the user's peers, and need not depend on extensive domain knowledge. The features list is then used as input to a model which, in turn, outputs a score or value indicating the level of a possible intrusion.

Figure 2:
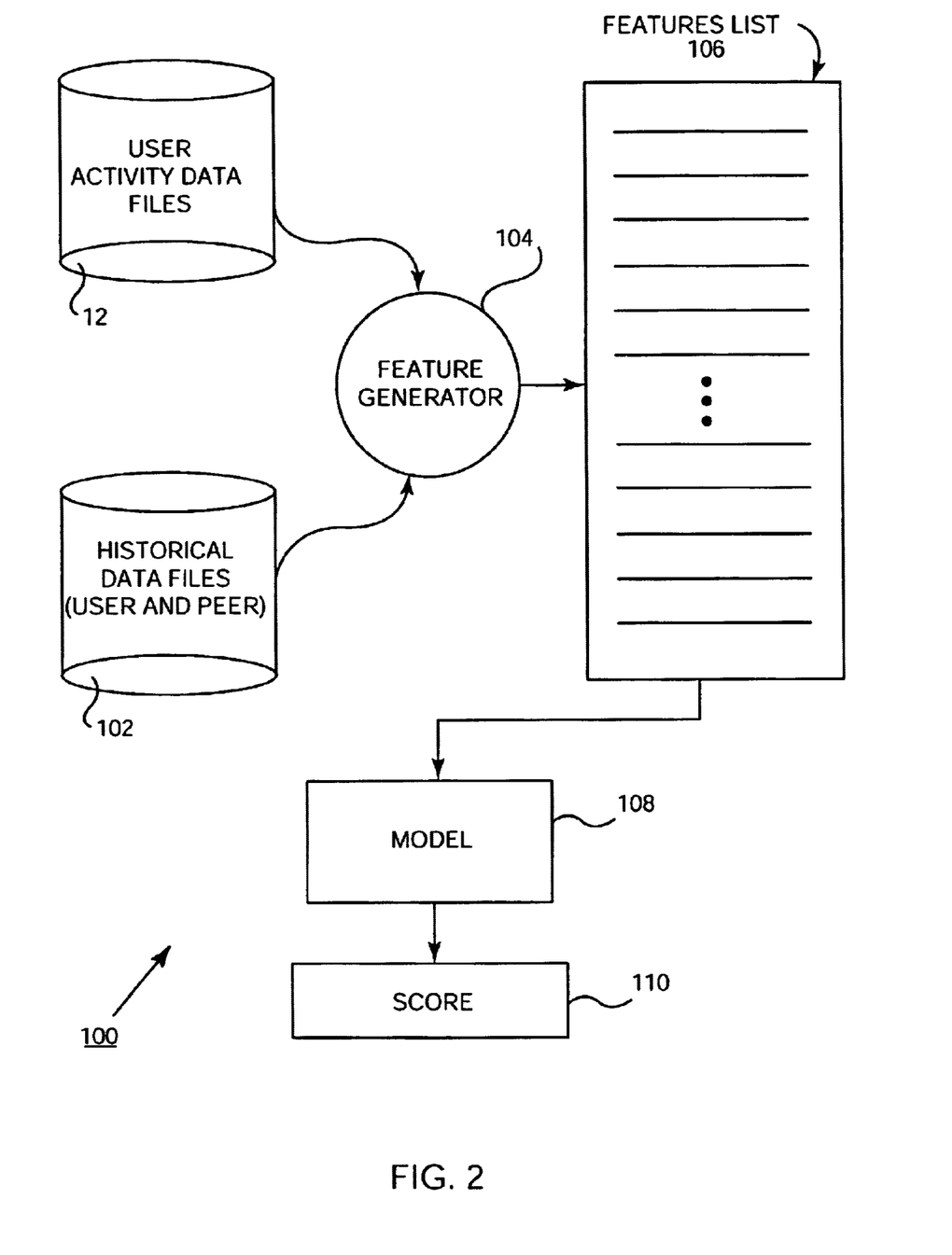
FIG. 2 is a block diagram of a computer network security system in accordance with the described embodiment of the present invention.

FIG. 2 is a block diagram of a computer network security system 100 in accordance with the described embodiment of the present invention. User activity files 12 are generally the same as those shown in FIG. 1. These files contain raw user data generated from various system resources and in the described embodiment, are parsed and organized according to user, and time of activity. They are described in greater detail in FIG. 3. Historical data 102 contains data relating to prior activity performed by a user and cumulative data of activities performed by the peer group (including the user) in a particular time frame. In other embodiments, smaller or larger groups, different from the user peer group can be monitored. In the described embodiment the peer group is all users in a particular system who have logged in for a particular time period, such as a typical work day. The generation of user historical data is described in greater detail in FIG. 4 and the generation of user peer group historical data is described in greater detail in FIG. 5.

User activity files 12 and historical data 102 are used as input to a feature generator or builder 104. In the described embodiment, feature generator 104 is implemented involving an equation for calculating a time-weighted mean, discussed in greater detail in FIGS. 6 and 7. The output from feature generator 104 is a features list 106. In the described embodiment, features list 106 contains 47 features which can be classified into several different categories such as violations, user activities, computer and network loads, and so on. Characteristics of feature list 106 are described in greater detail in FIG. 8. Individual features from features list 106 are used as input to a model 108. As is well known in the field of computer science, there are many different model processes, such as linear regression, Markov models, graphical models, and regression models. A model is trained to evaluate features to recognize the possibility of a network intrusion. By training model 108 to process certain types of features, it can recognize potential intrusions. As is well known in the art, a model can accept different types of features. One example of a feature is user login failure, such as the time between login failures for a particular user. Once the model receives all input features, it calculates a score 110. This score is based upon the input features and how the model has been trained. In the described embodiment, the model is trained using a neural network algorithm. A score 110 can be normalized to a number between 0 and 1000, a high number indicating a stronger possibility of an intrusion.

Figure 3:
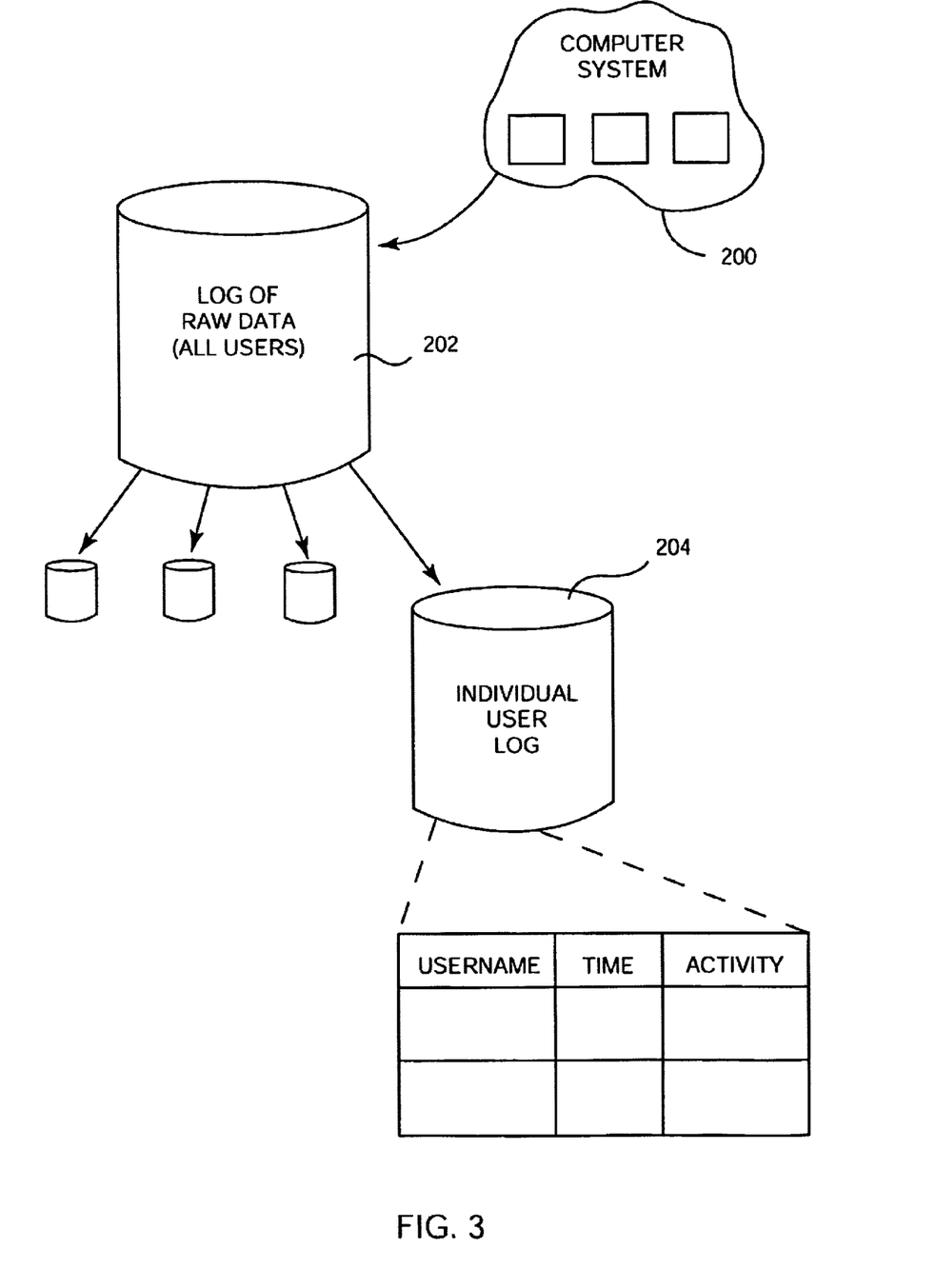
FIG. 3 is a schematic diagram showing the formation of user activity log files, or the raw user data, in accordance with one embodiment of the present invention.

FIG. 3 is a schematic diagram showing the formation of user activity files 12, or the raw user data, in accordance with one embodiment of the present invention. As mentioned above, user activity files 12 contain raw data of activities performed by users. As described below, user activity files 12 is made up of numerous individual user logs, such as user log 204 in FIG. 3. In the described embodiment, the users are on one particular computer system, typically supported by a mainframe computer and operating system. In other embodiments, the raw data can come from several computer systems each supported by different computers. Similarly, score 110 can be derived from data from one or more computer systems and can measure potential intrusions for one or all systems. A computer system 200 is shown containing a number of sources from which raw user activity data is drawn. Examples of these sources or files include operating system files containing executed commands, operations on programs, exceptions, operations on files, and other more data-specific files such as badge-in data. In the described embodiment the sources are maintained by the Multiple Virtual Storage ("MVS") operating system of the IBM Corporation, and used on IBM mainframe computers. These data sources are part of the MVS operating system and are created and maintained as part of the operating system. The process can be used in computer systems using operating systems other than MVS such as a Unix-based operating system. Using the example from above, to determine the time between login failures, the intrusion program checks user activity files 12.

A raw data log 202 contains user activity for all users logged in a particular computer system such as system 200. Computer system 200 parses raw data log 202 according to user and time of activity thereby creating a series of individual user logs, such as user log 204. In the described embodiment, user log 204 is a series of variable length records containing a user name, a timestamp of when the user activity occurred and the name of the specific user activity, as well as other information depending on the user activity or command performed. After data from the system resources is parsed according to user, user activity data is retained or kept in the form of user activity files 12, used as input to feature generator 104.

Figure 4:
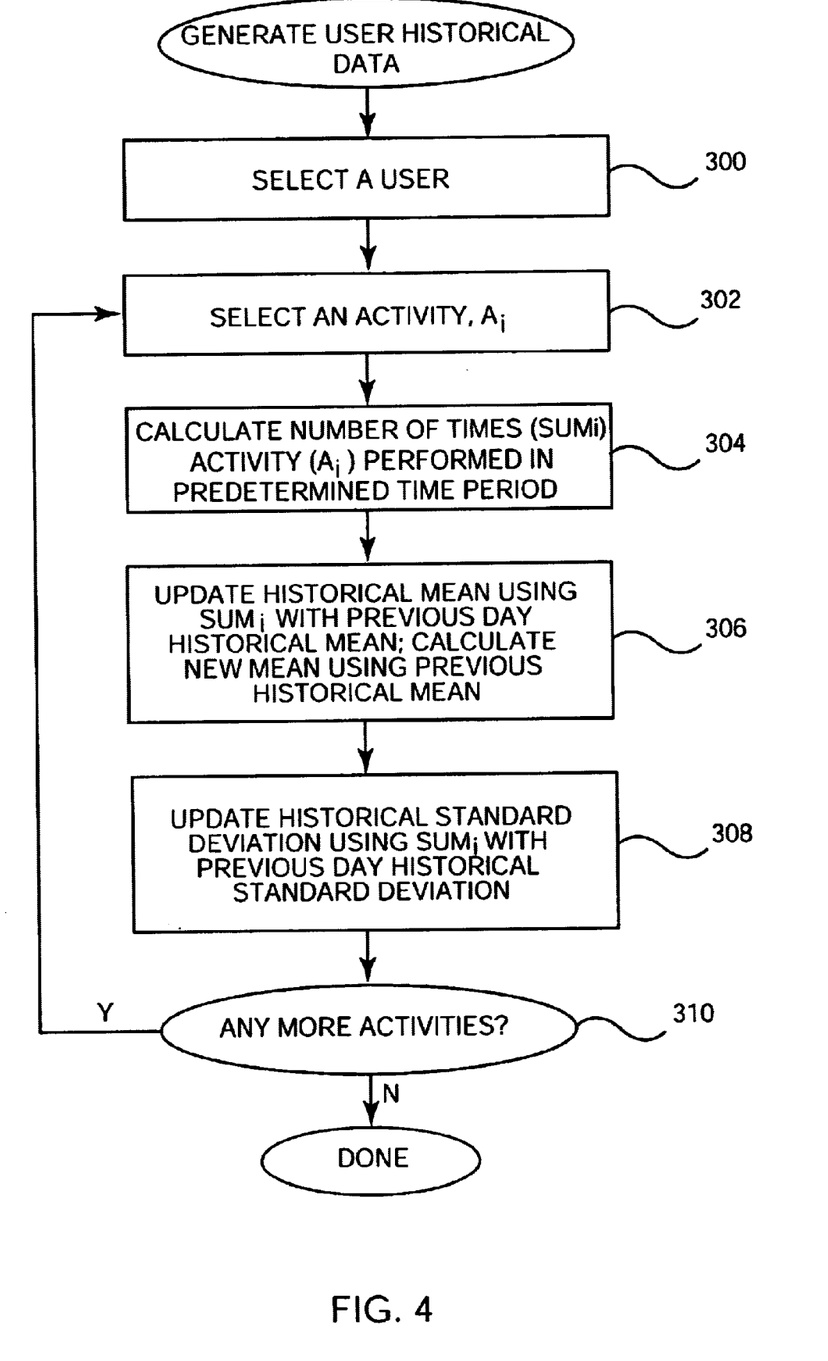
FIG. 4 is flow diagram of a process for generating user historical data in accordance with one embodiment of the present invention.

FIG. 4 is a flow diagram of a process for generating user historical data in accordance with one embodiment of the present invention. In the described embodiment the process is performed at the end of a user work day for each user logged in and for each computer system in an organization or enterprise. Thus, in the described embodiment, user historical data is generated once a day. In other embodiments, historical data can be generated more or less frequently depending on characteristics of the system, number of users, and the degree of intrusion detection desired. Generally, each activity is examined for a particular user and a statistical mean, or equivalent value, is calculated for that user for a particular day.

At step 300 a user is selected from a corpus of users who have logged onto a computer system for a particular day. In the described embodiment, historical data is generated for users who have logged on and performed at least some activities during the day. At step 302 a particular activity is selected from a predetermined list of activities that are monitored by the intrusion detection system. In the described embodiment, the activities can be divided into several categories such as violations, login failures, failures related to accessing a file, normal activity, resource usage, and others. In the described embodiment there is a predetermined set of 47 activities from which activities are selected.

At step 304 the intrusion detection program determines the number of times the selected activity is performed on a particular day by the selected user. In the described embodiment this is determined using a counter. The total number of times the selected activity is performed by the user is stored as $sum_i$. $Sum_i$ is not necessarily the number of times an activity is performed. It can also represent the total resource usage, total number of bytes transferred, among other quantities (i.e., it is not necessarily a counter). At step 306 $sum_i$ is used to calculate a historical mean of $sum_i$ by the user alone. In the described embodiment this is done by comparing $sum_i$ to a historical mean calculated for all or a predetermined number of previous sums. This historical mean is a time-weighted mean updated based on the new $sum_i$. In addition, the previous historical mean (i.e., the historical mean from the previous login period) is updated to reflect the new $sum_i$. The new user historical mean is saved in user and peer historical data file 102 as shown in FIG. 2.

At step 308 $sum_i$ is used to update a user historical standard deviation. In the described embodiment, this standard deviation is calculated for the selected user for that particular day. As with the user historical mean, a historical standard deviation is calculated using $sum_i$ and is stored in user historical file 102 from where it is used as input to feature generator 104. At step 310 the intrusion detection program determines whether there are any remaining activities to be examined from the activity list. If so, control returns to step 302 where the next activity is selected and the process is repeated. If there are no more activities in the list, the processing for generating historical data for a single user for a particular day is complete. The user historical standard deviation and historical mean values collectively comprise the user historical data which is subsequently used as one input to features generator 104.

Figure 5:
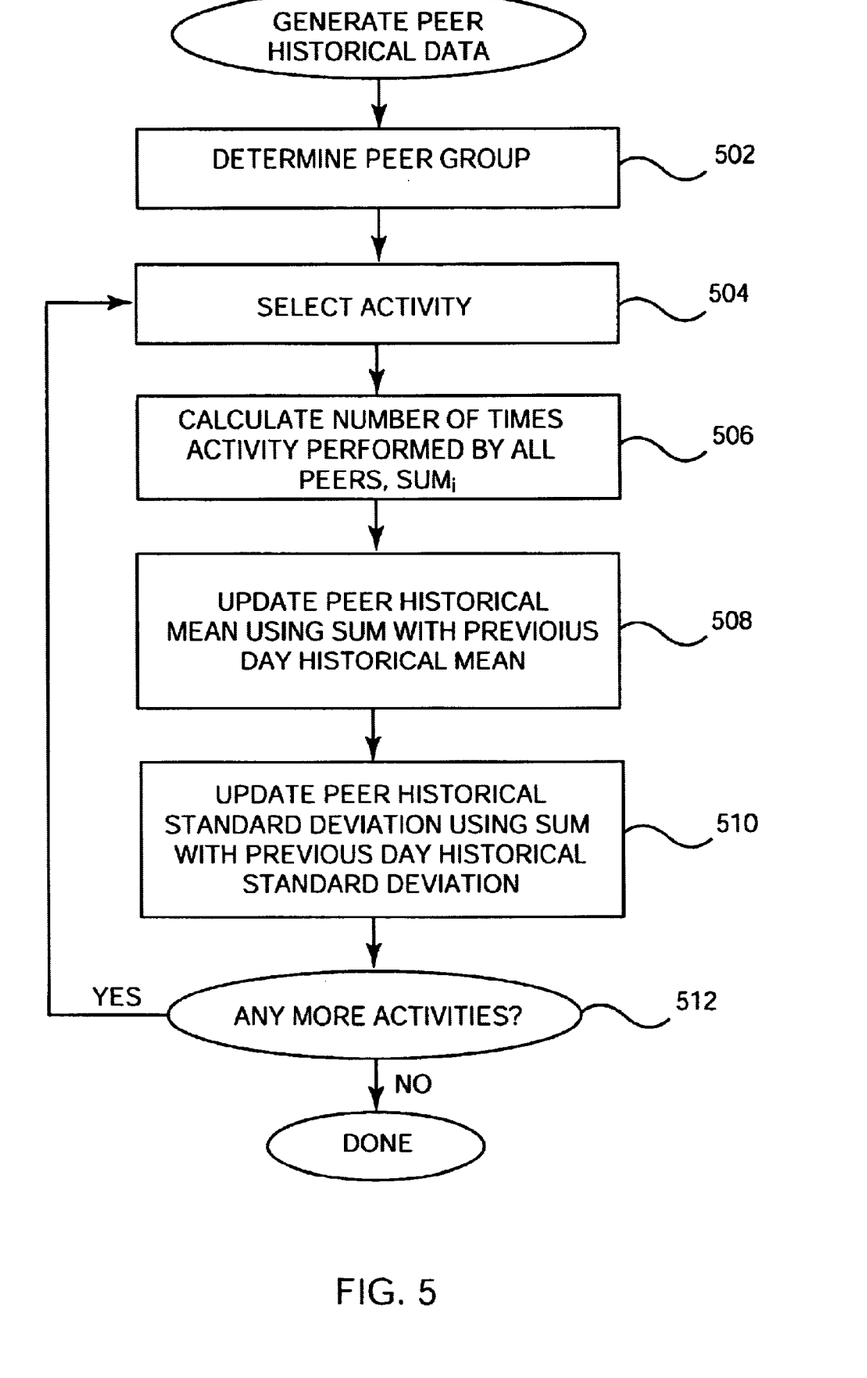
FIG. 5 is a flow diagram of a process for generating peer historical data in accordance with one embodiment of the present invention.

FIG. 5 is a flow diagram of a process for generating peer historical data in accordance with one embodiment of the present invention. This process is different from that depicted in FIG. 4 in that the historical data calculated here relates to the entire group of users logged onto a computer system for a particular day instead of just one selected user. In the described embodiment, this peer group includes the selected user as well. The peer group (which can be viewed as a fictitious user) can change frequently depending on who logs on the computer system.

At step 502 a peer group is formed based on all the users logged on the computer system that day. In other embodiments, there can be more than one computer system from which a peer group is formed or certain users from all those logged on may be excluded from the peer group if needed. Once the peer group is formed, an activity is selected at step 504. The activities are from the same list of activities used in step 302 of FIG. 4, having 47 activities in the described embodiment.

At step 506 another $sum_i$ is calculated based on the number of times each person in the peer group performed the selected activity in a particular time period. It is possible that some of the users in the peer group may not have performed the selected activity. At step 508 a peer historical mean is updated using $sum_i$ in a manner similar to calculating the user historical mean. In the described embodiment this is done by comparing $sum_i$ to a historical mean calculated for all or a predetermined number of previous sums. This peer historical mean is also a time-weighted mean updated based on the new $sum_i$. In addition, the previous historical mean (i.e., the historical mean from the previous login period) is updated to reflect the new $sum_i$. At step 510 the peer historical standard deviation is calculated in a manner similar to the user historical standard deviation as described in step 308 of FIG. 4. The peer historical mean and standard deviation values are saved in user and peer historical files 102 with the user historical data.

The peer historical standard deviation can be used to assign various weightings to the peer historical mean based on several criteria, such as time or other factors in the system. For example, a peer historical mean calculated four months prior to the present can be assigned a lighter weight than the historical mean calculated two days prior to the present with regard to determining the standard deviation. This is based on the assumption that behavior from two days ago should be given more importance than behavior from four months ago. In another example, a higher or lower weight can be assigned based on particular days of the weeks.

At step 512 the intrusion detection program determines whether there are any other activities from the predetermined list of activities to be examined. If so, control returns to step 504 where another activity is selected and the process is repeated. If there are no more activities, the process of generating peer historical data is complete.

Figure 6:
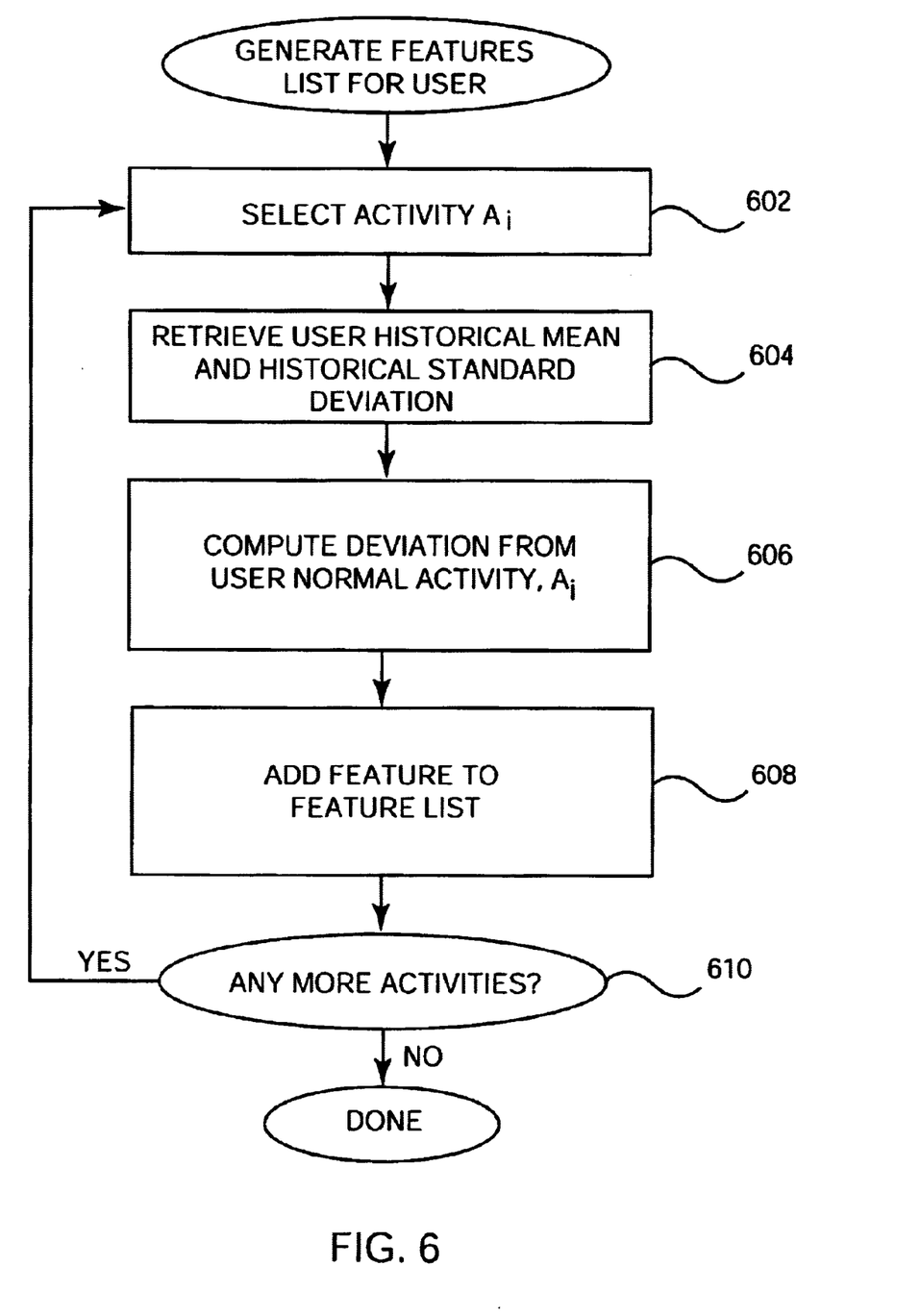
FIG. 6 is a flow diagram of a process for generating a features list containing data on a user's activity in accordance with one embodiment of the present invention.

FIG. 6 is a flow diagram of a process for generating a features list containing data on a user's activity in accordance with one embodiment of the present invention. The process of FIG. 6 depicts generation of a features list for a particular user for a particular time period, such as one day. The time period can be adjusted based on the needs of the systems and the desired accuracy of the intrusion detection program. In the described embodiment, the features list is a list of real numbers ranging from −5 to 5 where a low negative number indicates behavior less than normal and a positive number indicates behavior more frequent than normal. At step 602 an activity performed by a particular user is chosen from that user's activity list as was done in step 302 of FIG. 4. In the described embodiment, a features list, such as features list 106, is organized first by user, and within a user, by activity. In other embodiments the features list can be organized differently depending on requirements of the system. At step 604 the features generator, such as features generator 104, retrieves the user's historical mean and historical standard deviation for the selected activity. These values are drawn from user and peer historical data file 102.

At step 606 the features generator determines whether a user's activity for that day with respect to the selected activity is normal or deviates from past behavior. In the described embodiment this determination is made by calculating a normalized deviation of the user's historical mean from the user's activity for that particular day. That is, how far off the user's behavior is from the user's historical mean. In the described embodiment, this is done by subtracting the user historical mean from the activity level and dividing the result by the user historical standard deviation. This calculation is recorded as a value in the range of −5 to 5 as described above. This value is then stored in features list 106 at step 608. A features list is described in FIG. 8 below. At step 610 the intrusion detection program determines whether there are any remaining activities in the activity list for the selected user. If there are, control then returns to step 602 where another activity is selected and the process is repeated. If there are no more activities, the process of generating the user-specific portion of the features list is complete. Thus, a portion of the features list which contains each of a selected user's activities and a corresponding score indicating how close the user's actions are to previous behavior is completed.

Figure 7:
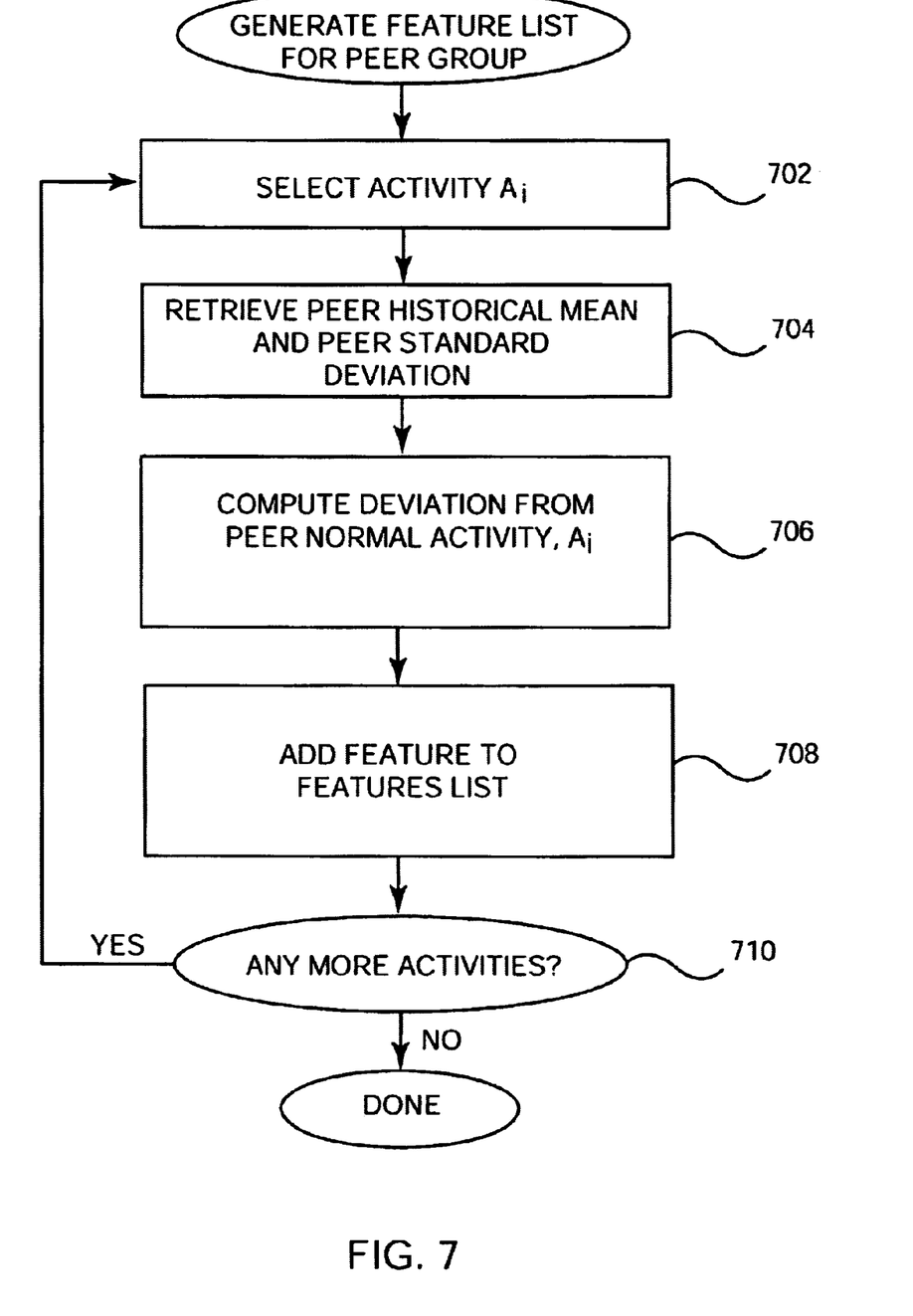
FIG. 7 is a flow diagram of a process for generating another portion of a features is a related to a user's activity relative to peer activity in accordance with one embodiment of the present invention.

FIG. 7 is a flow diagram of a process for generating another portion of a features list related to a user's activity relative to peer activity in accordance with one embodiment of the present invention. The steps described here are similar to those described in FIG. 6 except values used relate to peer data instead of user data. At step 702 an activity is selected for a particular user. In the described embodiment, this step is the same as step 602. At step 704 the peer historical mean and peer historical standard deviation are retrieved from the user and peer historical data files 102. These values are computed at steps 508 and 510 of FIG. 5 using peer historical data. At step 706 the behavior corresponding to the selected activity by the user is compared to typical behavior of the user's peers for that activity. Any deviation by the user from normal peer activity is computed, i.e., any abnormal behavior is measured. This is done by subtracting the user's current activity value from the peer historical mean and dividing the result by the peer historical standard deviation. This deviation or anomalous behavior is translated into a numerical value and added to the features list 106 at step 708. As with deviation from the user's own behavior, in the described embodiment this value is measured as a real number in the range of −5 to 5. At step 710 the intrusion program determines whether there are anymore activities in the activity list. If there are, control returns to step 702. If not, the process is done and a complete features list has been created.

Figure 8:
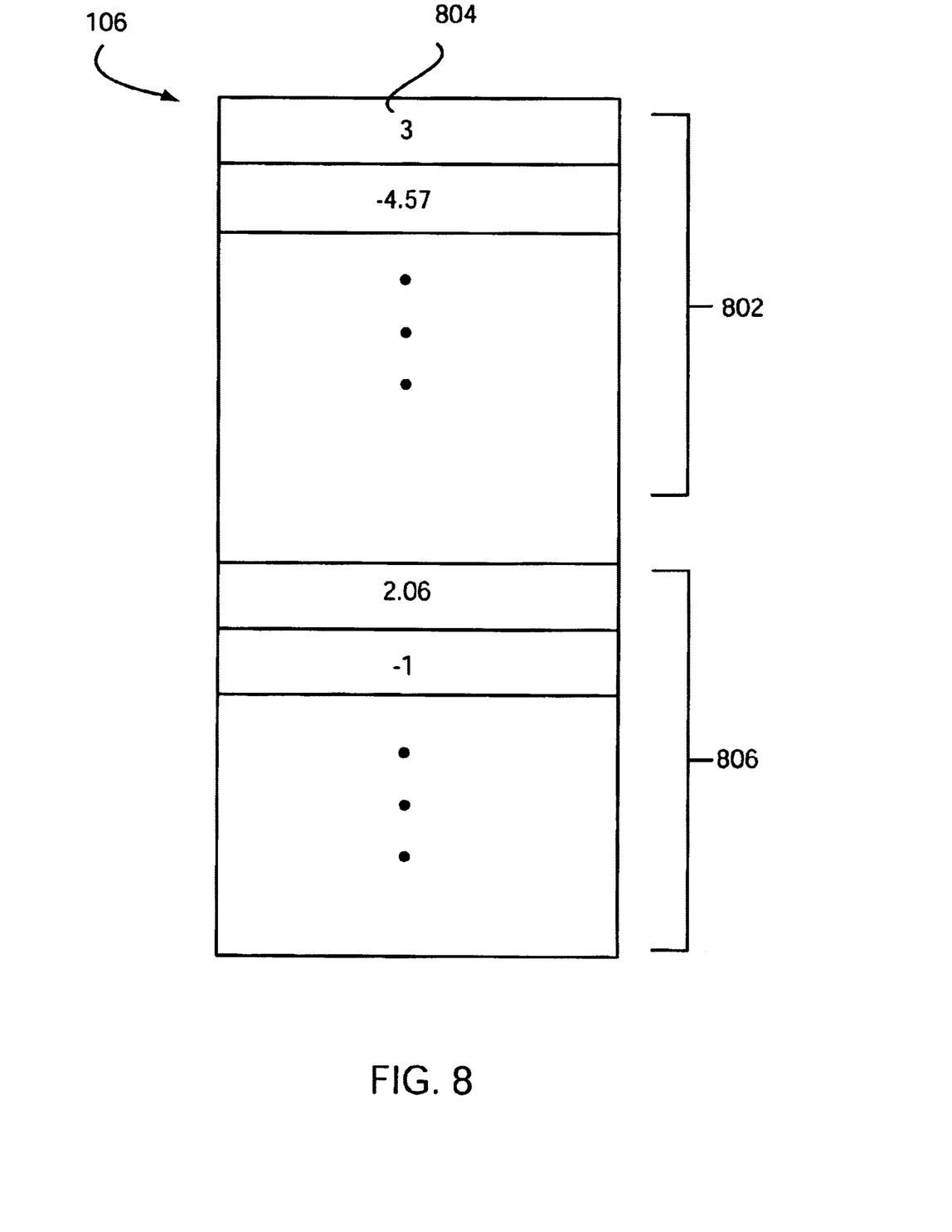
FIG. 8 is a schematic diagram of a features list in accordance with one embodiment of the present invention.

FIG. 8 is a schematic diagram of a features list in accordance with one embodiment of the present invention. As described above features list 106 contains a series of values corresponding to a deviation of the user's behavior from the user's past behavior and the behavior of the user's peer group for various activities. Features list 106 contains a series of values, each value corresponding to a particular activity for a particular user. The feature values for one user are grouped together. In the described embodiment, features for each user are divided into two sections. An example of a first section of features 802 corresponds to values comparing a user's behavior to the user's past behavior. Examples of individual values are shown as values 804. A process for generating these scores is described in FIG. 6. The number of activities tracked by the intrusion detection program can vary. Examples of various categories of these activities are described above. The types of activities monitored by the intrusion program can vary from system to system and will depend on the level and type of security desired.

A second section 806 corresponds to feature values derived from deviations of the user's behavior from the user's peer behavior for a particular activity. A process for generating these values is described in FIG. 7. In the described embodiment, the number of activities in the two sections is the same. Following section 806 is another section similar to section 802 for another user. As previously explained in FIG. 2, features list 106 is used as input to model 108 trained to receive as input particular features and which outputs a final score 110. It is worth noting that a user's peers can be defined in various ways, such as by privilege users as opposed to normal users, by system, or level of activity.

As described above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, matching, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a computer device, system or apparatus for performing the aforementioned operations. The system may be specially constructed for the required purposes, or it may be a general purpose computer, such as a server computer or a mainframe computer, selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 9:
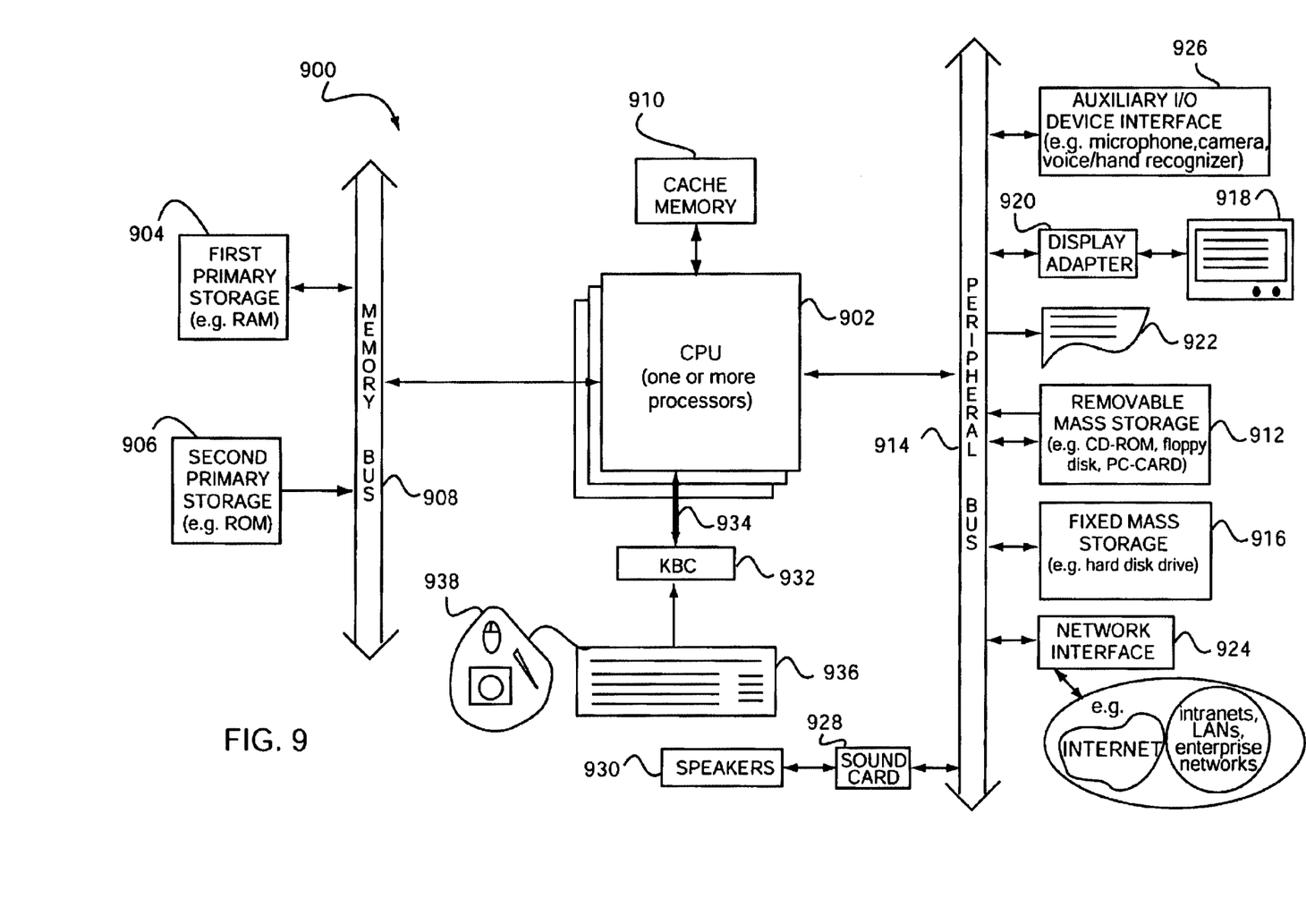
FIG. 9 is a block diagram of a typical computer system suitable for implementing an embodiment of the present invention.

FIG. 9 is a block diagram of a general purpose computer system 900 suitable for carrying out the processing in accordance with one embodiment of the present invention. FIG. 9 illustrates one embodiment of a general purpose computer system that, as mentioned above, can be a server computer, a client computer, or a mainframe computer. Other computer system architectures and configurations can be used for carrying out the processing of the present invention. Computer system 900, made up of various subsystems described below, includes at least one microprocessor subsystem (also referred to as a central processing unit, or CPU) 902. That is, CPU 902 can be implemented by a single-chip processor or by multiple processors. CPU 902 is a general purpose digital processor which controls the operation of the computer system 900. Using instructions retrieved from memory, the CPU 902 controls the reception and manipulation of input data, and the output and display of data on output devices.

CPU 902 is coupled bi-directionally with a first primary storage 904, typically a random access memory (RAM), and uni-directionally with a second primary storage area 906, typically a read-only memory (ROM), via a memory bus 908. As is well known in the art, primary storage 904 can be used as a general storage area and as scratch-pad memory, and can also be used to store input data and processed data, such as command and program name sequences. It can also store programming instructions and data, in the form of a message store in addition to other data and instructions for processes operating on CPU 902, and is used typically used for fast transfer of data and instructions in a bi-directional manner over the memory bus 908. Also as well known in the art, primary storage 906 typically includes basic operating instructions, program code, data, and objects used by the CPU 902 to perform its functions. Primary storage devices 904 and 906 may include any suitable computer-readable storage media, described below, depending on whether, for example, data access needs to be bi-directional or uni-directional. CPU 902 can also directly and very rapidly retrieve and store frequently needed data in a cache memory 910.

A removable mass storage device 912 provides additional data storage capacity for the computer system 900, and is coupled either bi-directionally or uni-directionally to CPU 902 via a peripheral bus 914. For example, a specific removable mass storage device commonly known as a CD-ROM typically passes data uni-directionally to the CPU 902, whereas a floppy disk can pass data bi-directionally to the CPU 902. Storage 912 may also include computer-readable media such as magnetic tape, flash memory, signals embodied on a carrier wave, smart cards, portable mass storage devices, holographic storage devices, and other storage devices. A fixed mass storage 916 also provides additional data storage capacity and is coupled bidirectionally to CPU 902 via peripheral bus 914. The most common example of mass storage 916 is a hard disk drive. Generally, access to these media is slower than access to primary storages 904 and 906. Mass storage 912 and 916 generally store additional programming instructions, data, and the like that typically are not in active use by the CPU 902. It will be appreciated that the information retained within mass storage 912 and 916 may be incorporated, if needed, in standard fashion as part of primary storage 904 (e.g. RAM) as virtual memory.

In addition to providing CPU 902 access to storage subsystems, the peripheral bus 914 is used to provide access other subsystems and devices as well. In the described embodiment, these include a display monitor 918 and adapter 920, a printer device 922, a network interface 924, an auxiliary input/output device interface 926, a sound card 928 and speakers 930, and other subsystems as needed.

The network interface 924 allows CPU 902 to be coupled to another computer, computer network, including the Internet or an intranet, or telecommunications network using a network connection as shown. Through the network interface 924, it is contemplated that the CPU 902 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 902 can be used to connect the computer system 900 to an external network and transfer data according to standard protocols. That is, method embodiments of the present invention may execute solely upon CPU 902, or may be performed across a network such as the Internet, intranet networks, or local area networks, in conjunction with a remote CPU that shares a portion of the processing. Additional mass storage devices (not shown) may also be connected to CPU 902 through network interface 924.

Auxiliary I/O device interface 926 represents general and customized interfaces that allow the CPU 902 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 902 is a keyboard controller 932 via a local bus 934 for receiving input from a keyboard 936 or a pointer device 938, and sending decoded symbols from the keyboard 936 or pointer device 938 to the CPU 902. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data that can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 908, peripheral bus 914, and local bus 934 are illustrative of any interconnection scheme serving to link the subsystems. For example, a local bus could be used to connect the CPU to fixed mass storage 916 and display adapter 920. The computer system shown in FIG. 9 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the number and types of features used can vary depending on the security needs of the computer network. In another example, the methods and systems described can run in operating systems other than MVS, such as the Windows NT™ operating system or a Unix-type operating system. In yet another example, formulas or algorithms can be used to calculate the described mean and standard deviation values other than the ones described. In addition, the network intrusion detection system can be used in other applications, such as in medical applications. Accordingly, the present embodiments are to be considered as illustrative and not restrictive, and the invention is not to be limited to the details given herein, but may be modified within the scope and equivalents of the appended claims.

What is claimed is:

1. A method of detecting an intrusion into a computer system, the method comprising:
   gathering user activity data corresponding to activities performed by an individual user;
   calculating historical values based on activities performed by users on the computer system;
   calculating a feature using the historical values and the user activity data; and
   utilizing the feature in a model to obtain a value indicating the likelihood of an intrusion whereby the historical values are adjusted according to shifts in normal behavior of users thereby enabling calculation of the feature to reflect changing characteristics of behavior of the users on the computer system.

2. A method as recited in claim 1 wherein gathering user activity data further includes: accessing user log files organized according to user and time.

3. A method as recited in claim 1 wherein gathering user activity data further includes:
   retrieving user activity data corresponding to a predetermined time period.

4. A method as recited in claim 1 further comprising gathering peer historical data including cumulative data of activities performed by a peer group.

5. A method as recited in claim 1 wherein calculating historical values further includes:
   calculating a user historical mean and a user historical standard deviation for a selected user.

6. A method as recited in claim 5 further comprising: calculating a peer historical mean and a peer historical standard deviation.

7. A method as recited in claim 5 wherein calculating a user historical mean and a user historical standard deviation further includes:
   examining activities performed by the individual user.

8. A method as recited in claim 5 further comprising counting the number of times an activity is performed by the individual user.

9. A method as recited in claim 5 further including calculating a normalized user deviation from normal behavior of the individual user using the user activity data.

10. A method as recited in claim 1 wherein calculating historical values further includes accessing the user activity data at predetermined time intervals.

11. A method as recited in claim 1 wherein calculating a feature further includes:
    retrieving the user historical mean and the user historical standard deviation; and
    computing a first deviation of behavior of the selected user from the user historical mean.

12. A method as recited in claim 11 wherein calculating a feature further includes:
    retrieving the peer historical mean and the peer historical standard deviation; and
    computing a second deviation of behavior of the selected user from the peer historical mean.

13. A method as recited in claim 11 wherein the user historical mean for a particular activity is calculated based on a time-weighted user historical standard deviation.

14. A method as recited in claim 12 wherein the peer historical mean for a particular activity is calculated based on a time-weighted peer historical standard deviation.

15. A method of generating a feature to be used in a model, the method comprising:
    collecting user-specific activity data for a plurality of activities;
    generating user-specific historical data for a particular activity utilizing the user-specific activity data;
    generating peer historical data for the particular activity;
    utilizing the user-specific historical data and the peer historical data to generate a feature associated with the particular activity wherein the feature reflects current behavior and past behavior of a particular user and of a group of users on a computer system with respect to the particular activity.

16. A method as recited in claim 15 wherein utilizing the user-specific historical data and the peer historical data to generate a feature further comprises:
    computing a user deviation from normal behavior of the particular user for the particular activity.

17. A method as recited in claim 15 wherein utilizing the user-specific historical data and the peer historical data to generate a feature further comprises:
    computing a peer deviation from normal behavior of the particular user for the particular activity.

18. A method as recited in claim 15 wherein generating user-specific historical data for a particular activity utilizing the user-specific activity data further comprises:
    determining a first count of the number of times the particular activity was performed by the user in a predetermined time period;
    updating a previous user historical mean value associated with the particular activity using the first count thereby deriving a current user historical mean value; and
    updating a previous user historical standard deviation value associated with the particular activity using the first count thereby deriving a current user historical standard deviation value.

19. A method as recited in claim 15 wherein determining a first count further comprises accessing the user-specific activity data.

20. A method as recited in claim 19 wherein the user-specific activity data includes a user identifier, an activity descriptor, and an activity timestamp.

21. A method as recited in claim 15 wherein generating peer historical data for the particular activity further includes
    determining a second count of the number of times the particular activity was performed by the group of users in a predetermined time period;
    updating a previous peer historical mean value associated with the particular activity using the second count thereby deriving a current peer historical mean value; and
    updating a previous peer historical standard deviation value associated with the particular activity using the second count thereby deriving a current peer historical standard deviation value.

22. A computer network intrusion detection system comprising:
    a user activity data file containing user-specific data related to activities performed by a particular user;
    a historical data file containing statistical data related to past behavior of a user and of a peer group; and
    a features generator accepting as input the user-specific data and the statistical data related to past behavior of a user and of a peer group wherein the features generator calculates a feature based on current and past behavior of the user and current and past behavior of the peer group.

23. A network intrusion detection system as recited in claim 22 further comprising:

a model trained to accept as input a feature generated by the features generator and to output a score indicating the likelihood that a particular activity is an intrusion.

24. A network intrusion detection system as recited in claim 22 further comprising:

a features list having a plurality of segments, a segment corresponding to a user and containing a plurality of values corresponding to activities performed on the system.

25. A network intrusion detection system as recited in claim 24 wherein a segment in the features list includes a first section storing a plurality of user-related values and a second section storing a plurality of peer-related values.

26. A network intrusion detection system as recited in claim 22 wherein the user activity data file further includes a user identifier, an activity description, and a timestamp.

27. A network intrusion detection system as recited in claim 22 wherein the historical data file further includes a user historical mean and a peer historical mean.

28. A network intrusion detection system as recited in claim 22 wherein the historical data file further includes a user historical standard deviation and a peer historical standard deviation.

29. A computer-readable medium containing programmed instructions arranged to detect an intrusion into a computer system, the computer-readable medium including programmed instructions for:

gathering user activity data corresponding to activities performed by an individual user;

calculating historical values based on activities performed by users on the computer system;

calculating a feature using the historical values and the user activity data; and utilizing the feature in a model to obtain a value indicating the likelihood of an intrusion whereby the historical values are adjusted according to shifts in normal behavior of users thereby enabling calculation of the feature to reflect changing characteristics of behavior of the users on the computer system.

30. A computer-readable medium as recited in claim 29 further comprising programmed instructions for gathering peer historical data including cumulative data of activities performed by a peer group.

31. A computer-readable medium containing programmed instructions arranged to generate a feature to be used in a model, the computer-readable medium including programmed instructions for:

collecting user-specific activity data for a plurality of activities;

generating user-specific historical data for a particular activity utilizing the user-specific activity data;

generating peer historical data for the particular activity;

utilizing the user-specific historical data and the peer historical data to generate a feature associated with the particular activity wherein the feature reflects current behavior and past behavior of a particular user and of a group of users on a computer system with respect to the particular activity.

* * * * *